(12) United States Patent
Horesh et al.

(10) Patent No.: US 11,797,644 B2
(45) Date of Patent: *Oct. 24, 2023

(54) IDENTIFYING CHECKSUM MECHANISMS USING LINEAR EQUATIONS

(71) Applicant: INTUIT INC., Mountain View, CA (US)

(72) Inventors: Yair Horesh, Kfar-Saba (IL); Yehezkel S. Resheff, Tel Aviv (IL); Shimon Shahar, Rishon Letziyon (IL); Noah Eyal Altman, Hod HaSharon (IL)

(73) Assignee: INTUIT, INC., Mountain View, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/316,822

(22) Filed: May 11, 2021

(65) Prior Publication Data

US 2021/0263996 A1 Aug. 26, 2021

Related U.S. Application Data

(63) Continuation of application No. 16/526,863, filed on Jul. 30, 2019, now Pat. No. 11,036,828.

(51) Int. Cl.
*G06F 17/16* (2006.01)
*G06F 17/12* (2006.01)

(52) U.S. Cl.
CPC .............. *G06F 17/16* (2013.01); *G06F 17/12* (2013.01)

(58) Field of Classification Search
CPC .......... G06F 17/16; G06F 17/12; G06F 21/64; G06Q 20/401
USPC ....................................................... 708/607
See application file for complete search history.

(56) References Cited

U.S. PATENT DOCUMENTS

| | | |
|---|---|---|
| 2002/0107815 A1 | 8/2002 | Carlson |
| 2019/0180345 A1 | 6/2019 | Xie et al. |
| 2021/0021690 A1 | 1/2021 | He |

*Primary Examiner* — Tan V Mai
(74) *Attorney, Agent, or Firm* — Patterson + Sheridan, LLP

(57) ABSTRACT

Certain aspects of the present disclosure provide techniques for detecting errors in account numbers. One example method generally includes receiving, from a user device, an entered number associated with a user and determining, based on a first portion of the entered number, an entity associated with the entered number. The method further includes obtaining, from an account number database, a plurality of account numbers associated with the entity and generating, from the plurality of account numbers, an account number matrix. The method further includes attempting to solve a multiplication equation of the account number matrix, wherein a solution of the multiplication equation is a vector of constants, upon determining a solution to the multiplication equation, determining whether the entered vector is a valid number for the entity and upon determining the entered vector is a valid number for the entity, storing the entered number in the account number database.

20 Claims, 4 Drawing Sheets

IDENTIFYING CHECKSUM MECHANISMS USING LINEAR EQUATIONS

CROSS REFERENCE TO RELATED APPLICATIONS

This application is a continuation of and hereby claims priority under 35 U.S.C. § 120 to pending U.S. patent application Ser. No. 16/526,863, filed on Jul. 30, 2019, the contents of which are incorporated herein by reference in their entirety.

INTRODUCTION

Aspects of the present disclosure relate generally to checksums appended to strings.

Checksums are commonly used to provide a check mechanism to ensure proper transmission of a given string (e.g., of digits or text characters). In general, a checksum (which may itself be a string or a single digit or character) is produced by a checksum function taking a string as input and performing various operations (typically, limited to addition, multiplication and modulo) to produce the checksum. As one example, financial institutions frequently append a checksum digit as the final digit of an account number, to verify that the account number is a correct account number for a particular financial institution.

One issue with the use of checksums is that generally only the creator of a particular string and those it has shared the information with knows the exact function used to produce the checksum digit(s). Thus, if other entities attempt to verify a particular string, the other entities must query the creator of the string to request the function used to create the checksum and verify the string. In some cases the creator may be unwilling to share the function, while even for creators willing to share the network and time constraints of performing such querying may effectively prevent certain tasks involving checksums from being performed. Therefore, systems and methods are needed which can identify a checksum function for a particular application of checksums.

BRIEF SUMMARY

Certain embodiments provide a system and a method for detecting errors in account numbers. The method generally includes receiving, from a user device, an entered number associated with a user and determining, based on a first portion of the entered number, an entity associated with the entered number. The method further includes obtaining, from an account number database, a plurality of account numbers associated with the entity and generating, from the plurality of account numbers, an account number matrix. The method further includes attempting to solve a multiplication equation of the account number matrix, wherein a solution of the multiplication equation is a vector of constants, upon determining a solution to the multiplication equation, determining, based on the vector of constants, whether the entered vector is a valid number for the entity and upon determining the entered vector is a valid number for the entity, storing the entered number in the account number database.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
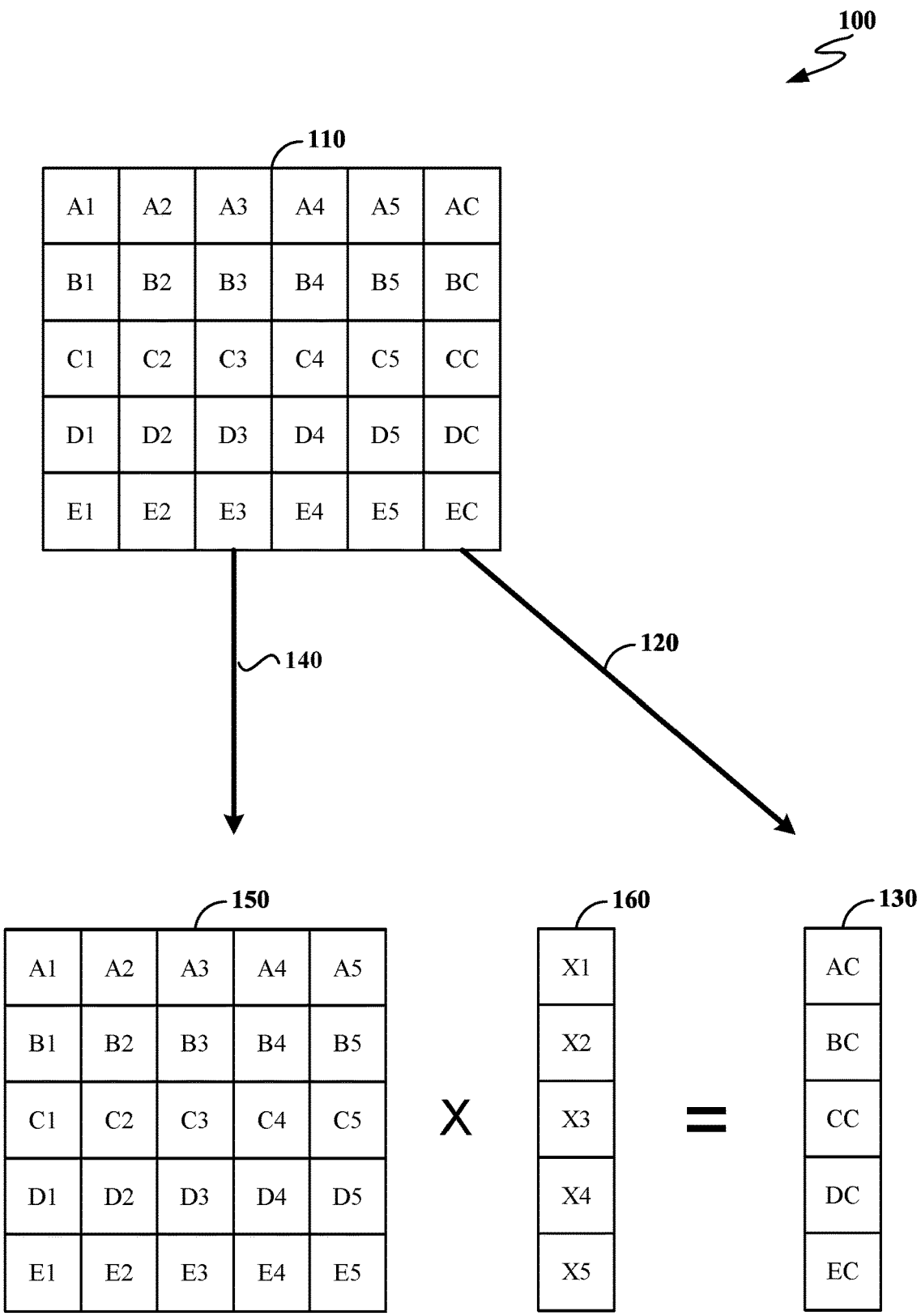
FIG. 1 depicts an example process for performing setting up and solving a multiplication equation.

Aspects of the present disclosure provide apparatuses, methods, processing systems, and computer readable mediums for determining a checksum function for a particular checksum scheme.

Checksums are widely used in many applications, and one common application is as a checksum digit appended to the end of a number, such as an account number. Checksum functions in wide use for this application tend to use three types of computations to generate checksums digits: multiplication, addition and modulo. Additionally, multiplication and addition are associative over modulo. These three computations create a linear relationship between the checksum function and the checksum digits. That is, a checksum function used to produce a single digit can be represented by the equation $y = \mod(mx+b)$.

Because checksum functions create a linear relationship with produced checksum digits, a particular checksum function can be reverse-engineered with the same complexity as solving a set of linear equations, given enough examples of numbers and produced checksum digits. To solve a checksum function for account numbers of length D, a checksum solver must obtain examples of account numbers produced by the checksum function numbering D−1. Then, the checksum solver separates the checksum digit (the final digit) from each account number, and creates a vector of the checksum digits of length D−1 called a checksum vector. The checksum solver then also creates an account number matrix of size D−1 by D−1. Then, the checksum solver creates a constants vector the same length as the checksum vector, of variables numbered from 1 to D−1. The constants vector is always of this length, but initially the constants vector is filled only with unknown variables.

By setting up matrix multiplication equation of the account number matrix multiplied by the constants vector equaling the checksum vector, a system of linear equations may be set up. The checksum solver can then identify values for the constants vector resulting in a solution to the system of linear equations. If such a solution exists the solution is a particular set of constants $x^1$ through $x^{D-1}$ which can be used to produce a checksum identically to the checksum function. Because it produces the checksum identically, it can also be used to verify checksums of a particular account number.

For example, consider a financial services application which uses ACH numbers to provide financial services to users. ACH numbers include a routing portion and an account portion. The routing portion indicates a financial institution associated with a particular ACH number. Typically, the account portion ends with a checksum digit. Upon receipt of an account number from a user, the financial services application can identify a financial institution associated with the account number. If the financial services application has a sufficient number of example account portions for the financial intuition, meaning at least one less account portion than the length of the account portion, the financial services institution can construct an account number matrix as described above. Then, by solving the matrix multiplication equation described above, the financial services application may be able to determine a set of constants that can be used to verify if the account number as entered by the user is a valid account number for the financial institution, without obtaining details of the checksum function from the financial institution.

Use of this method as described may allow entities attempting to verify various strings containing checksums to independently verify those checksums without prior knowledge of the checksum scheme in use. For certain tasks, this may provide significant time and network resource savings compared to the current method of verifying checksums, which involves transmitting individual strings to a creator of the checksum scheme, as checksum creators typically do not share the details of a particular checksum scheme.

FIG. 1 depicts an example process 100 for performing setting up and solving a multiplication equation. Process 100 may be performed by a checksum solver, such as a software routine executing on a computing device. Process 100 starts with account numbers 110. Account numbers 110 are five account numbers A-E. Generally, account numbers 110 are account numbers associated with a particular entity, such as ACH numbers associated with a financial institution. Account numbers 110 are shown as a matrix for simplicity, although in some examples, account numbers 110 may be raw digits obtained from a database used to store account numbers. In this example each account number of account numbers 110 has six digits although in practice account numbers with more digits may be used. The final digit of each account number is a checksum digit, indicated by "C." For example, "AC" represents the checksum digit for account number "A," "BC" represents the checksum digit for the account number "B" and so forth.

At 120, the checksum solver separates the checksum digits from account numbers 110 to form checksum vectors 130. As stated the final digit of each of account numbers 110 is a checksum digit, so by separating those digits, a vector consisting of only known checksum digits may be constructed. Simultaneously with 120, the checksum solver may, at 140, store the remaining digits of account numbers 110 as account number matrix 150. Because the number of account numbers in account numbers 110 is one less than the length of the account numbers, the resulting account number matrix 150 is a square matrix, simplifying matrix multiplication.

Following creating account number matrix 150 and checksum vector 130, the checksum solver may also instantiate constants vector 160 with variables X1-X5. In general, constants vector 160 is the same length as checksum vector 130, which is also one less than the length of the account numbers of account numbers 110. In this example, account number matrix is a five by five matrix, and checksum vector 130 and constants vector 160 have length five, because the account numbers have six digits total. If the account numbers instead had twelve digits, account number matrix 150 would be an eleven by eleven matrix, and checksum vector 130 and constants vector 160 would have length eleven.

As shown, account number matrix 150, constants vector 160 and checksum vector 130 comprise a multiplication equation for solving a checksum function of the account numbers. In particular, by setting the product of account number matrix 150 and constants vector 160 equal to checksum vector 130, a system of linear equations can be created. In this example, the system of linear equations are $$(A1 \cdot X1)+(A2 \cdot X2)+(A3 \cdot X3)+(A4 \cdot X4)+(A5 \cdot X5)=AC$$

$$(B1 \cdot X1)+(B2 \cdot X2)+(B3 \cdot X3)+(B4 \cdot X4)+(B5 \cdot X5)=BC$$

$$(C1 \cdot X1)+(C2 \cdot X2)+(C3 \cdot X3)+(C4 \cdot X4)+(C5 \cdot X5)=CC$$

$$(D1 \cdot X1)+(D2 \cdot X2)+(D3 \cdot X3)+(D4 \cdot X4)+(D5 \cdot X5)=DC$$

$$(E1 \cdot X1)+(E2 \cdot X2)+(E3 \cdot X3)+(E4 \cdot X4)+(E5 \cdot X5)=EC$$

That is, to solve the system of linear equations the checksum solver must identify a set of constants X1-X5 that satisfies the above equations. However, the above system of linear equations describes an accurate solution to the problem where the checksum digits not single digit. One additional step is needed to solve the equations with correct values, in particular using the modulo 10 operator in each equation as follows:

$$\mathrm{mod}((A1 \cdot X1)+(A2 \cdot X2)+(A3 \cdot X3)+(A4 \cdot X4)+(A5 \cdot X5))=AC$$

$$\mathrm{mod}((B1 \cdot X1)+(B2 \cdot X2)+(B3 \cdot X3)+(B4 \cdot X4)+(B5 \cdot X5))=BC$$

$$\mathrm{mod}((C1 \cdot X1)+(C2 \cdot X2)+(C3 \cdot X3)+(C4 \cdot X4)+(C5 \cdot X5))=CC$$

$$\mathrm{mod}((D1 \cdot X1)+(D2 \cdot X2)+(D3 \cdot X3)+(D4 \cdot X4)+(D5 \cdot X5))=DC$$

$$\mathrm{mod}((E1 \cdot X1)+(E2 \cdot X2)+(E3 \cdot X3)+(E4 \cdot X4)+(E5 \cdot X5))=EC$$

If such a set of constants can be identified, a solution to the checksum function has been identified, so that any account number of the entity can be verified using the constants. For example, for a particular account number of "123456" can be verified by checking if:

$$\mathrm{mod}((1 \cdot X1)+(2 \cdot X2)+(3 \cdot X3)+(4 \cdot X4)+(5 \cdot X5))=6$$

Figure 2:
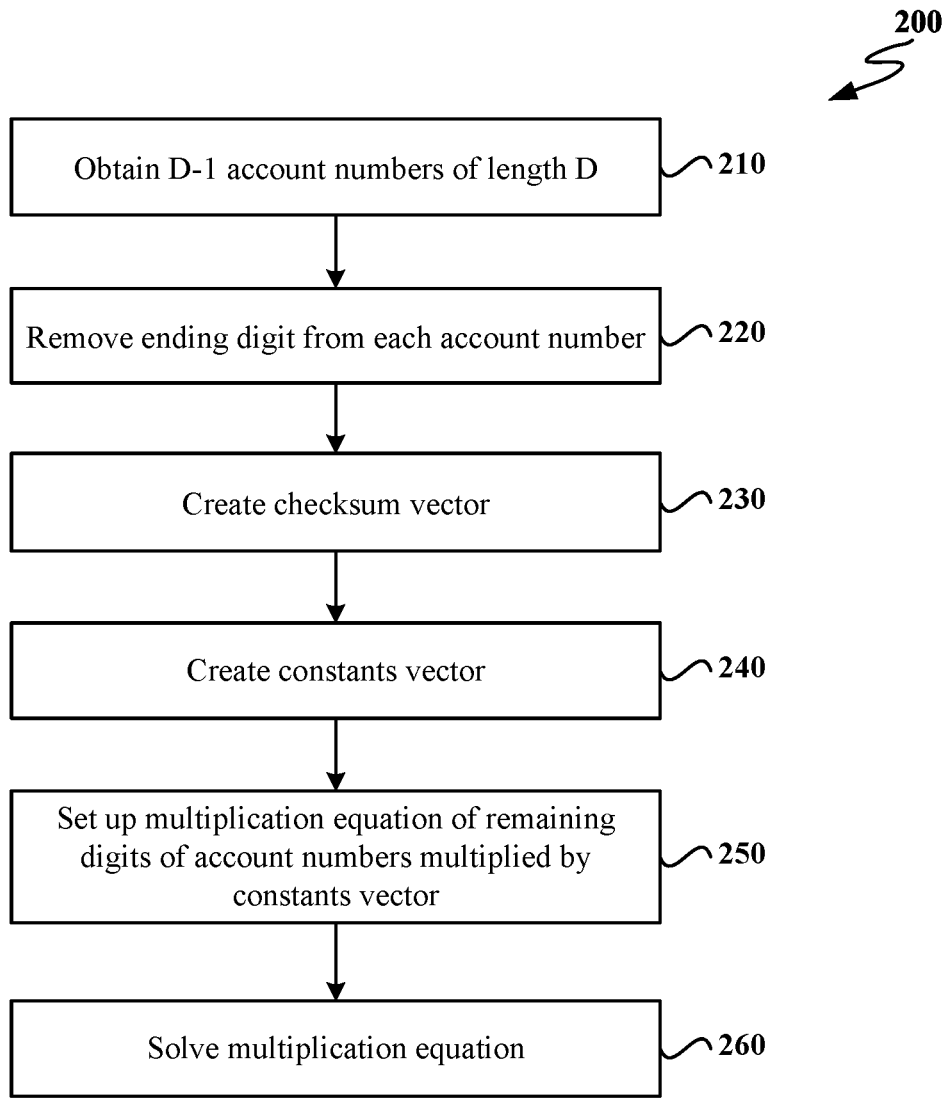
FIG. 2 is a flow chart of an example method for reverse engineering a checksum function.

FIG. 2 is a flow chart of an example method 200 for reverse engineering a checksum function. Method 200 begins at 210, where account numbers numbering D−1 and of length D are obtained. For example, a financial services application executing on a computing system may have access to a database of account numbers corresponding to a plurality of different entities, or financial institutions. If all D−1 account numbers are associated with the same entity, they may be used in solving a checksum scheme for the entity.

At 220, the ending digit from each of the D−1 account numbers is removed. The ending digits of the account numbers are, as discussed above, checksum digits for the account numbers. Then, at 230, a checksum vector of length D−1 containing these separated digits is created. Simultaneously, the remaining digits may be stored in a D−1 by D−1 account numbers matrix. Then, at 240 a constants vector also of length D−1 is created and instantiated with variables.

At 250, a multiplication equation is set up using the account numbers matrix, the checksum vector and the constants vector as discussed above. In particular, the equation is set as the account numbers matrix multiplied by the constants vector equals the checksum vector. Because the account numbers matrix has as many columns (D−1) as the constants vector has rows (D−1) multiplication between the account numbers matrix and the constants vector is possible. A D−1 by D−1 matrix multiplied by a 1 by D−1 matrix (a vector) is equal to another 1 by D−1 matrix, in this case the checksum vector.

At 260, the multiplication equation set up at 250 is solved. The solution to the multiplication equation is a set of constants for the constants vector that satisfies the equation. The solution to the multiplication can thereafter be used as a general purpose account number verification tool for all account numbers associated with the entity.

Figure 3:
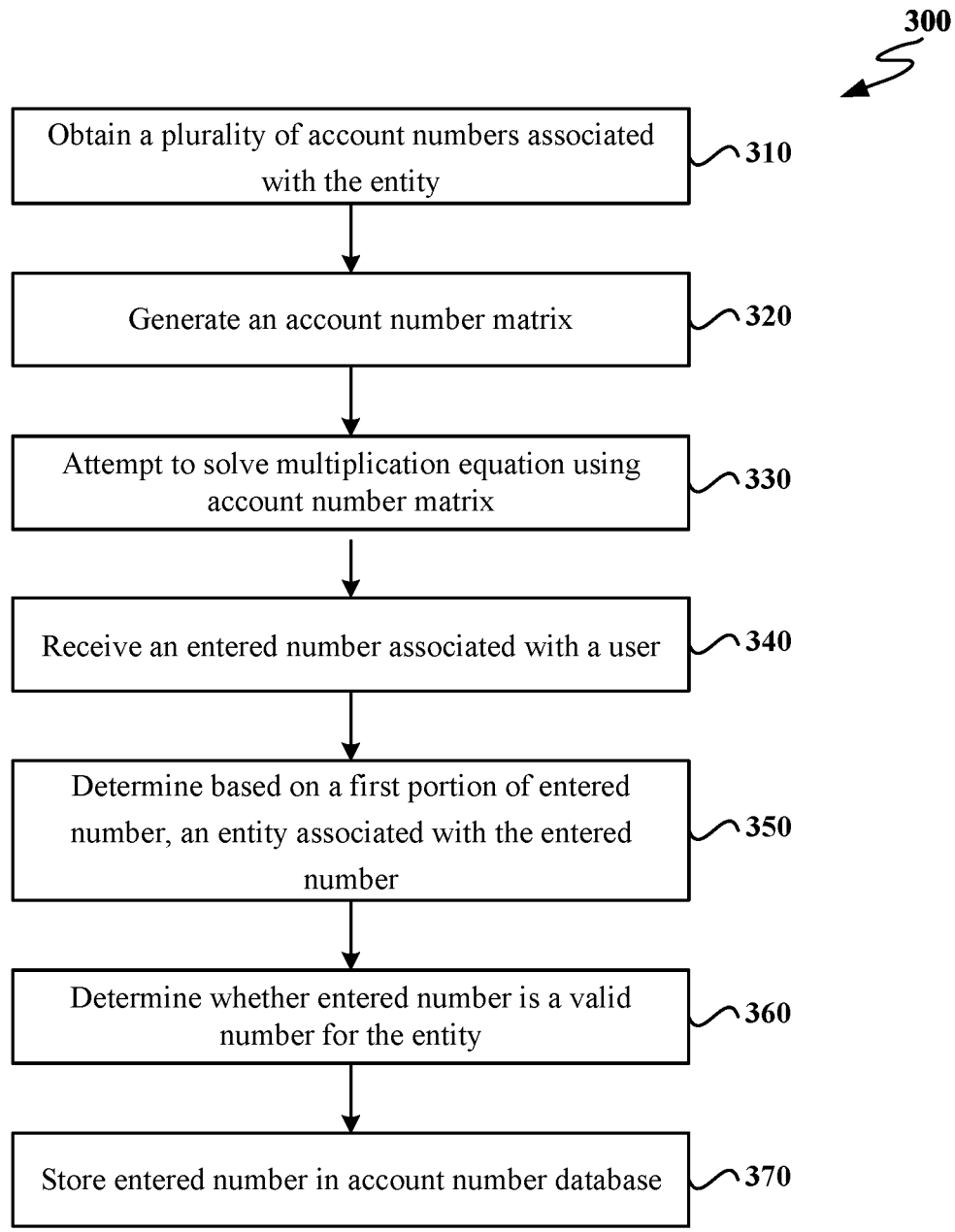
FIG. 3 is a flow chart of an example method for detecting errors in account numbers.

FIG. 3 is a flow chart of an example method 300 for detecting errors in account numbers. Method 300 may be performed by a server executing a financial services application. Method 300 starts at 310, where, the server obtains, from an account number database, a plurality of account numbers associated with a particular entity. For example, ACH account numbers include a first portion as a routing portion that identifies the financial institution associated with that routing portion. Each account number issued by a financial institution includes the same routing portion, but a different account portion. As discussed, the server may process a financial information for a plurality of users, and thus, may have access to a plurality of account numbers associated with those users. The server has access to a database of stored account numbers, and can obtain, from the database, account numbers associated with the entity that is, account numbers including the same routing portion as the entered number.

At 320, the server generates, from the plurality of account numbers, an account number matrix. The account number matrix, as discussed above, includes the digits of the account numbers up to but not including the final digit, which is a checksum digit for the account number. If the number of account numbers obtained is one less than the length of the account numbers the account number matrix is a square matrix.

At 330, the server attempts to solve a multiplication equation of the account number matrix. A solution of the multiplication equation is a vector of constants. The vector of constants can thereafter be used to verify other account numbers of the entity, by determining if the checksum digit of the account number is a correct checksum digit for the preceding numbers.

At 340, upon determining a solution to the multiplication equation, the server receives, from a user device, an entered number associated with a user. In general, the server may be used to process account numbers and other financial information for the user of the user device. The user may enter the entered number into the user device, and the user device thereafter transmits the entered number to the server for processing. Before using the entered number to perform any tasks, the server may first verify that the entered number is a valid account number.

At 350, the server determines, based on a first portion of the entered number, that the entered number is associated with the entity discussed above. For example, as discussed above, the first portion of the entered number may include a routing portion, if the entered number is an ACH account number.

At 360, the server determines, based on the vector of constants, whether the entered vector is a valid number for the entity. For example, by multiplying each digit of the account number by each digit of the vector of constants, and then performing a modulo 10 operation on the result, a server-calculated checksum may be obtained. If the server-calculated checksum is equal to the actual final digit of the entered number, then it is highly likely that the entered number is a valid account number for the entity. At 370, if the entered number is determined to be a valid number for the entity, the server stores the entered number in the account number database.

In some examples of method 300, prior to generating the account number matrix the server separates an ending digit from each of the plurality of account numbers and storing the ending digit from each of the plurality of account numbers as a checksum vector. The server separates the checksum digits from the plurality of account numbers as discussed with respect with 340. The separated digits can then be used to create a vector of checksum digits.

In some examples of method 300 the vector of constants has length equal to one less than the length of the entered number.

The server may determine there is no single solution to the multiplication equation, in some examples of method 300. This may occur when the entity was previously merged with another entity or adopted some account numbers from a separate entity, and the other entity used a different checksum scheme than the entity.

In such examples, the server may additionally generate a second account number matrix based on a second plurality of account numbers, wherein the second plurality of account numbers is randomly selected, solve a second multiplication equation based on the second account number matrix, determine the entity uses at least two checksum functions and determine to use a solution to the second multiplication equation to determine validity of account numbers associated with the entity. If more than one solution can be identified for certain subsets of account numbers associated with the entity, entered numbers can be checked for validity against each identified solution.

In some cases of method 300 the account number matrix is M, the vector of constants is C, the checksum vector is V and the multiplication equation is M×C=V.

In some examples, the server receives an additional entered number from a second user and determines whether the additional entered number is valid using the vector of constants. Once a solution to the checksum scheme of the entity is identified, subsequent account numbers associated with the entity can be validated using the solution.

In some cases, the server may determine the entered number is not a valid number for the entity and prompt the user for a correct account number. Such a prompting may be performed by transmitting a correction request to the user device for the user device to relay to the user, such as via a user interface of an application executing on the user device.

Figure 4:
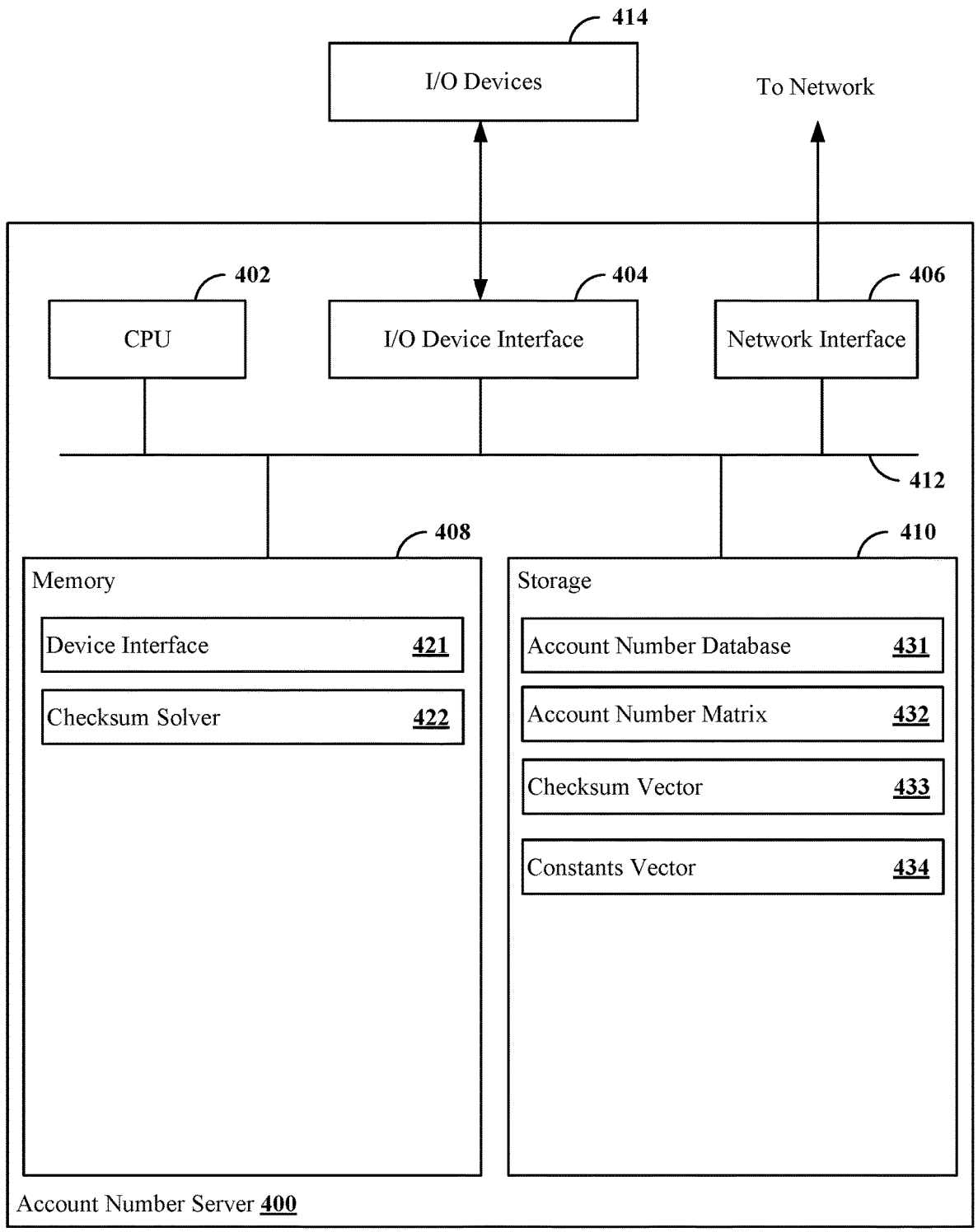
FIG. 4 is a block diagram of example account number server.

FIG. 4 is a block diagram of example account number server 400, according to one embodiment. As shown, the account number server 400 includes, without limitation, a central processing unit (CPU) 402, one or more input/output (I/O) device interfaces 404, which may allow for the connection of various I/O devices 414 (e.g., keyboards, displays, mouse devices, pen input, etc.) to account number server 400, network interface 406, memory 408, storage 410, and an interconnect 412.

The CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, memory 408, and storage 410. The CPU 402 is included to be representative of a single CPU, multiple CPUs, a single CPU having multiple processing cores, and the like. The I/O device interface 404 may provide an interface for capturing data from one or more input devices integrated into or connected to the account number server 400, such as keyboards, mice, touchscreens, and so on. The memory 408 may represent a random access memory (RAM), while the storage 410 may be a solid state drive, for example. Although shown as a single unit, the storage 410 may be a combination of fixed and/or removable storage devices, such as fixed drives, removable memory cards, network attached storage (NAS), or cloud-based storage.

As shown, the memory 408 includes device interface 421 and checksum solver 422, which are software routines of account number server 400. Device interface 421 and checksum solver 422 may execute based on programming code stored within storage 410

As shown, the storage 410 includes account number database 431, account number matrix 432, checksum vector 433 and constants vector 434. In general, account number server 400 receives a number entered at a user device using device interface 421, via network interface 406. Device interface 421 then passes the number to checksum solver 422, which attempts to establish a vector which can be used to verify if the number is a valid number for an entity known to account number server 400. First, checksum solver 422 obtains a plurality of account numbers from account number database 431 and uses the plurality of account numbers to create account numbers matrix 432 and checksum vector 433. Then, the checksum solver solves a multiplication equation based on account numbers matrix 432 to identify a solution to the multiplication equation stored as constants vector 434. Checksum solver 422 can then use constants vector 434 to determine if the number entered by the user is a valid account number for the entity.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for detecting errors in account numbers, comprising:
    obtaining, from an account number database, a plurality of account numbers associated with an entity;
    generating, from the plurality of account numbers, an account number matrix;
    attempting to solve a multiplication equation of the account number matrix, wherein a solution of the multiplication equation is a vector of constants;
    upon determining the solution to the multiplication equation, receiving, via a user interface of a user device, a number associated with a user;
    determining, based on the vector of constants, whether the number is a valid number for the entity; and
    upon determining the number is a valid number for the entity, storing the number in the account number database.

2. The method of claim 1, further comprising, prior to generating the account number matrix:
    separating an ending digit from each of the plurality of account numbers; and
    storing the ending digit from each of the plurality of account numbers as a checksum vector.

3. The method of claim 2, wherein the account number matrix is M, wherein the vector of constants is C, wherein the checksum vector is V, and wherein the multiplication equation is M×C=V.

4. The method of claim 1, wherein the vector of constants has a length equal to one less than a length of the number.

5. The method of claim 1, further comprising determining there is no single solution to the multiplication equation.

6. The method of claim 5, further comprising:
    generating a second account number matrix based on a second plurality of account numbers, wherein the second plurality of account numbers is randomly selected;
    solving a second multiplication equation based on the second account number matrix;
    determining the entity uses at least two checksum functions; and
    determining to use a solution to the second multiplication equation to determine validity of account numbers associated with the entity.

7. The method of claim 1, further comprising:
    receiving an additional number from a second user; and
    determining whether the additional number is valid using the vector of constants.

8. The method of claim 1, further comprising:
    determining the number is not a valid number for the entity; and
    prompting the user for a correct account number.

9. A method for detecting errors in account numbers, comprising:
    obtaining, from an account number database, a plurality of account numbers associated with an entity;
    generating, from the plurality of account numbers, an account number matrix;
    attempting to solve a multiplication equation of the account number matrix, wherein a solution of the multiplication equation is a vector of constants;

upon determining the solution to the multiplication equation, receiving, via a user interface of a user device, a number associated with a user;

determining, based on a first portion of the number, that the number is associated with the entity;

determining, based on the vector of constants, whether the number is a valid number for the entity; and upon determining the number is a valid number for the entity, storing the number in the account number database.

10. The method of claim 9, further comprising, prior to generating the account number matrix:

separating an ending digit from each of the plurality of account numbers; and storing the ending digit from each of the plurality of account numbers as a checksum vector.

11. The method of claim 10, wherein the account number matrix is M, wherein the vector of constants is C, wherein the checksum vector is V, and wherein the multiplication equation is M×C=V.

12. The method of claim 9, wherein the vector of constants has a length equal to one less than a length of the number.

13. The method of claim 9, further comprising determining there is no single solution to the multiplication equation.

14. The method of claim 13, further comprising:

generating a second account number matrix based on a second plurality of account numbers, wherein the second plurality of account numbers is randomly selected;

solving a second multiplication equation based on the second account number matrix;

determining the entity uses at least two checksum functions; and determining to use a solution to the second multiplication equation to determine validity of account numbers associated with the entity.

15. The method of claim 9, further comprising:

receiving an additional number from a second user; and determining whether the additional number is valid using the vector of constants.

16. The method of claim 9, further comprising:

determining the number is not a valid number for the entity; and prompting the user for a correct account number.

17. A system for detecting errors in account numbers, comprising:

one or more processors; and a memory comprising instructions that, when executed by the one or more processors, cause the system to:

obtain, from an account number database, a plurality of account numbers associated with an entity;

generate, from the plurality of account numbers, an account number matrix;

attempt to solve a multiplication equation of the account number matrix, wherein a solution of the multiplication equation is a vector of constants;

upon determining the solution to the multiplication equation, receive, via a user interface of a user device, a number associated with a user;

determine, based on the vector of constants, whether the number is a valid number for the entity; and upon determining the number is a valid number for the entity, store the number in the account number database.

18. The system of claim 17, wherein the instructions, when executed by the one or more processors, further cause the system to, prior to generating the account number matrix:

separate an ending digit from each of the plurality of account numbers; and store the ending digit from each of the plurality of account numbers as a checksum vector.

19. The system of claim 18, wherein the account number matrix is M, wherein the vector of constants is C, wherein the checksum vector is V, and wherein the multiplication equation is M×C=V.

20. The system of claim 17, wherein the vector of constants has a length equal to one less than a length of the number.

* * * * *